United States Patent Office 3,206,316
Patented Sept. 14, 1965

3,206,316
WATER DISPERSIBLE CAROTENOID PREPARATIONS AND PROCESSES THEREOF
Heinrich Kläui, Riehen, Switzerland, assignor to Hoffmann-La Roche Inc., Nutley, N.J., a corporation of New Jersey
No Drawing. Filed Oct. 11, 1961, Ser. No. 144,539
Claims priority, application Switzerland, Oct. 17, 1960, 11,603/60
21 Claims. (Cl. 99—148)

This invention relates to water dispersible carotenoid preparations and to processes for their preparation.

Carotenoids such as carotene, lycopene, bixin, zeaxanthin, cryptoxanthin, lutein, canthaxanthin, $\beta$-apo-8'-carotenal, $\beta$-apo-12'-carotenal and esters of hydroxyl- or carboxyl-containing members of this group have attained considerable importance in technology as coloring agents. Carotenoids are yellow to red pigments which possess considerable interest as replacements for synthetic coloring agents, for use as coloring materials, e.g. for foodstuffs; in consequence of the relationship of the carotenoids to, or their identity with, pigments occurring in the plant and animal kingdoms. All carotenoids are substances which are insoluble in water and which are relatively high melting. Moreover, carotenoids are substances which are very sensitive to oxydation. These characteristics militate against direct employment of the crystalline materials for coloration of foodstuffs or feedstuffs; in this form, the materials are poorly resorbed or give poor coloring effects. The above-mentioned characteristics of carotenoids are especially disadvantageous in the coloring of liquid media; since, as a result of the water-insolubility of carotenoids, it is quite difficult to obtain a homogeneous color effect. Hence, the water insolubility of the carotenoids prevents their direct use as coloring agents for coloring foodstuffs having an aqueous base such as fruit juices, mineral water with fruit juice or with fruit juice scents, ice-cream, etc., and dry products which are to be added to water in their original form or first prepared with water prior to use such as, for example, pudding powders, soup powders, powdered eggs, tomato concentrates and dry beverage bases such as lemonade powder.

It has now been found that carotenoid preparations which are dispersible in aqueous solutions and which color aqueous preparations to a desired uniform color can be prepared by forming a solution of a carotenoid in a volatile organic carotenoid diluent in the presence of a salt of a higher fatty acid ester of ascorbic acid or a mixture of a higher fatty acid ester of ascorbic acid with a basic agent. The volatile diluent is then removed from the resulting mixture, preferably by concentrating the mixture in the presence of water until the removal of the volatile diluent takes place or until the mixture is reduced to dryness. Where concentrating to dryness is carried out, the residue is optionally dispersed in water.

The carotenoids which can be used in the practice of the invention are the known natural or synthetic available representatives of this class of compounds useful as coloring agents, e.g. carotene, lycopene, bixin, zeaxanthin, cryptoxanthin, lutein, canthaxanthin, $\beta$-apo-8'-carotenal, $\beta$-apo-12'-carotenal, $\beta$-apo-8'- carotenoic acid, and esters of hydroxyl- or carboxyl-containing members of this group, such as the methyl and ethyl ester. The above carotenoids can be employed singly or in admixtures, depending on the color desired. Especially suitable is $\beta$-carotene which can be obtained from nature or can be prepared synthetically. Aqueous solutions of $\beta$-carotene-colored preparations, preferred in the present invention, desirably have a $\beta$-carotene concentration of about 15 mg. per liter and are yellow-orange. The color tone depends on the ratio of the isomers present. Solutions with predominantly cis-$\beta$-carotene are yellow and solutions of the corresponding trans-isomer are orange.

Carotenoid aldehydes such as $\beta$-apo-8'-carotenal ($C_{30}$) and $\beta$-apo-12'-carotenal ($C_{35}$) when used to form the carotenoid preparations of the invention exhibit an unusual coloring ability for the preparation of colored preparations, i.e. they disperse in aqueous solutions with a red color. These aldehydes, when used in mixtures with $\beta$-carotene, form carotenoid preparations which color aqueous solutions orange and red-orange. They are especially useful for the coloring of beverages and for bases of orange concentrates because of their marked color intensity. A mixture of, for example, two parts of $\beta$-carotene and one part of $\beta$-apo-8'-carotenal ($C_{30}$) produces a color about three times as intense as the same quantity of $\beta$-carotene.

Carotenoid preparations of the invention employing canthaxanthin, for example, in a dilution of 15 mg. per liter of water, form red solutions having marked coloring ability which are useful for the coloring of fruit juices, syrups, confectioneries and the like.

Examples of esters of ascorbic acid with higher fatty acids such as those with 12 to 20 carbon atoms used to form the water dispersible carotenoid preparations of the invention include the esters of myristic acid, palmitic acid, and stearic acid. Preferred for commercial reasons is the palmitic acid ester of ascorbic acid. The quantities of the higher fatty acid esters of ascorbic acid useful for forming the water dispersible carotenoid preparations depend on various factors, but in general range from about 0.1 to 10, preferably from about 0.3 to 10, times by weight of the quantity of carotenoid employed. For carotenoids especially difficult to disperse or those with strongly marked crystallization tendencies the higher fatty acid ester of ascorbic acid is preferably employed in at least an equal quantity by weight, more preferably two or more times the weight of the carotenoid. The tendency of the carotenoids to crystallize out during the evaporation can be prevented by employing particularly rapid evaporation. Suitable apparatus for the evaporation must be equipped to maintain mixing, for example, by rotation of the evaporation flask or through intensive stirring. The evaporation is preferably carried out under vacuum.

The tendency of the carotenoids to crystallize upon evaporation of a solution thereof in an organic volatile solvent can further be hindered by adding to the solution crystallization-inhibiting substances, for example, lecithin. Also, small quantities of water, glycerine, fatty acids and their esters (especially glycerides), etc., can conveniently be employed.

As disclosed above, either a salt of a higher fatty acid ester of ascorbic acid is employed or a mixture of a higher fatty acid ester or ascorbic acid together with a basic agent. Besides alkali metal carbonates and hydroxides, e.g. sodium carbonate, sodium hydroxide, potassium hydroxide, etc., which are the preferred basic agents, amino acids can also be used for the same purpose. Furthermore, the use of basic amino acids, for example arginine and lysine, may involve a crystallisation retarding tendency. Where a salt of a higher fatty acid ester of ascorbic acid is employed, the salt is a salt of the acid formed with one of the above basic agents, e.g. an amino acid salt or an alkali metal salt.

The higher fatty acid esters of ascorbic acid, or salts thereof, can in part be replaced by other solution-enhancing materials. In many cases the use of a mixture of solution-enhancing materials is especially effective. For example, the addition of sodium tocopherol phosphate permits both the preparation of especially faint opalescent solutions and, simultaneously, a lowering of the total quantity of solvent-enhancing agent required (based on the carotenoid). Additional solvent-enhancing agents which can be used together with the fatty acid ester of ascorbic acid are sodium taurocholate, salts of para-aminobenzoic acid, and the like.

An additional benefit derived from the ascorbic fatty acid esters employed in the carotenoid preparations of the invention is in the protection they afford the carotenoids against oxidation. An additional increase in oxidation resistance can be obtained by the addition of phenolic antioxidants. Especially active antioxidants for the preparations of the invention are tocopherol and nor-dihydroguaiaretic acid.

The volatile organic carotenoid solvents employed herein include halogenated aliphatic hydrocarbons, preferably polyhalogenated methane, for example, chloroform, carbon tetrachloride, and methylene chloride. Other volatile solvents can also be employed, such as benzene or carbon disulfide.

In a preferred process of the invention the new water dispersible carotenoid preparations are prepared by mixing together a solution of the carotenoid and a salt of a higher fatty acid ester of ascorbic acid or a mixture of a higher fatty acid ester of ascorbic acid and a basic agent, and either (1) evaporating the resulting mixture to dryness, and directly taking up the residue in water, or (2) adding the resulting mixture to water and thereafter distilling off the volatile solvent therefrom. The carotenoid concentrate (having a content of from about 1 to 5% carotenoid) prepared by the latter process variant is useful for direct coloring of solutions as, for example, water or fruit juices.

In mineral water or in hard water with a considerable content of calcium, the formation and precipitation of the difficultly soluble calcium salts of the higher fatty acid esters of ascorbic acid frequently occur. This precipitation can be prevented, or at least diminished, if a protective colloid is added to the aqueous solution. Especially good protective colloids are gelatine, dextrose, saccharose ester of a higher fatty acid, especially saccharose oleate, gum arabic tragacanth, pectin, and the like. Known complex formers such as ethylene-diamine-tetraacetic acid show a weak but still appreciable effect.

Protective colloid-containing aqueous carotenoid preparations can be converted into the dry product which are especially preferred carotenoid preparations, due to their stability, easy solubility, and exceptional compatibility with hard water and other aqueous solutions. The conversion into the dry form can be carried out, for example, in a vacuum drying oven, through spray- or mill-drying, through freeze-drying or through drying in a thin-layer evaporator.

When gelatin is employed as the protective colloid, to the usual type gelatins (having a high, medium or low bloom member) there can be added also a partially degraded gelatin. The partial decomposition of the gelatin can, for example, be carried out through treatment of an aqueous gelatin solution with pappain at 38° C. for about 10 minutes, or with acids such as tartaric acid, citric acid, ascorbic acid. By this treatment the protective colloid activity is not essentially altered, but the preparation is rendered more easily soluble in cold water.

The carotenoid preparations prepared by the process of the invention are dispersible in water and form homogenous color in dilute transparent solutions. The protective colloid-containing products are (depending on the type of protective colloid used) soluble in cold or moderately warm water (about 35° C.). The products prepared by the process of the invention are suitably used in at least 10-fold quantities of water, preferably heated to about 85° C. to dissolve them first, and thereafter, if required, the solutions are diluted still further. In this form they are suitable for coloring of fruit drinks, as, for example, orange drinks, tomato products (juice and paste), syrups, preserved foods, cheeses and the like. In contrast to many azo dyes, the new carotenoid preparations are not destroyed by ascorbic acid which occurs naturally in fruit juices, confectioneries, and the like. In fact, aqueous dispersions of many carotenoids are stabilized by ascorbic acid.

For certain uses the preparations of the invention can be employed in dry form, for example, or coloring pudding powders, dry powders, powdered eggs, tomato powder concentrates, and the like.

The invention will be better understood with reference to the following examples which are given for illustration purposes only and are not meant to limit the invention.

*Example 1*

16.5 g. of trans-$\beta$-carotene, 16.5 g. of ascorbylpalmitate, and 1.1 g. of $\alpha$-tocopherol are dissolved in 375 g. of chloroform by warming. This solution is emulsified in a solution consisting of 64.5 g. of gelatin, 170 g. of water, and 1.65 g. of sodium hydroxide, then poured onto a plate and dried under vacuum at about 40° C.

*Example 2*

9.9 g. of trans-$\beta$-carotene, 6.6 g. of cis-$\beta$-carotene, 16.5 g. of ascorbylpalmitate, and 1.1 g. of $\alpha$-tocopherol are dissolved in 375 g. of chloroform by warming. This solution is then introduced with stirring into a solution consisting of 64.5 g. of gelatin, 170 g. of water, and 1.65 g. of sodium hydroxide, and the resulting emulsion dried under vacuum at 40° C.

*Example 3*

5.5 g. of $\beta$-apo-8'-carotenal ($C_{30}$), 11 g. of cis-$\beta$-carotene, 16.5 g. of ascorbylpalmitate, and 1.1 g. of $\alpha$-tocopherol are dissolved in 375 g. of chloroform with warming. This solution is homogenized with a solution consisting of 64.5 g. of gelatin, 170 g. of water, and 1.65 g. of sodium hydroxide, and then dried under vacuum at 40° C.

*Example 4*

6.05 g. of $\beta$-apo-8'-carotenal ($C_{30}$), 2.2 g. of canthtaxanthin, 8.25 g. of ascorbylpalmitate, and 0.55 g. of $\alpha$-tocopherol are dissolved in 190 g. of chloroform with warming. This solution is introduced with stirring into a solution consisting of 32.25 g. of gelatin, 85 g. of water, and 0.825 g. of sodium hydroxide; thereafter the solution is homogenized and dried under vacuum at 40° C.

*Example 5*

16.5 g. of $\beta$-apo-8'-carotenal ($C_{30}$), 16.5 g. of ascorbylpalmitate, and 1.1 g. of $\alpha$-tocopherol are dissolved in 375 g. of chloroform with warming. This solution is homogenized with a solution consisting of 64.5 g. of gelatin, 170 g. of water, and 1.65 g. of sodium hydroxide, and dried under vacuum at 40° C.

*Example 6*

16.5 g. of cis-$\beta$-carotene, 16.5 g. of ascorbylpalmitate, and 1.1 g. of $\alpha$-tocopherol are dissolved in 375 g. of chloroform with warming. This solution is emulsified with a solution of 64.5 g. of gelatin, 170 g. of water, and 1.65 g. of sodium hydroxide and dried in a drying roller under vacuum at 60° C.

100 mg. of this $\beta$-carotene preparation is dispersed in 2 ml. of water with warming at 35° C. The solution is heated to 60° C. on a water bath and diluted with 8 ml. of water. This colored solution is added to 150 g. of simple syrup and 10 g. of orange concentrate (1:6) and mixed thoroughly. After the addition of 2 g. of citric acid dissolved in 2 ml. of water it is filled to one liter with carbonic acid-saturated water. This forms an orange drink having a beautiful yellow-orange color.

Example 7

16.5 g. of canthaxanthin, 16.5 g. of ascorbylpalmitate, and 1.1 g. of α-tocopherol are dissolved in 375 g. of chloroform with warming. This solution is homogenized with a solution of 64.5 g. of gelatin, 170 g. of water, and 1.65 g. of sodium hydroxide, and dried under vacuum at 40° C.

Example 8

*Solution I.*—5 g. of β-apo-8'-carotenal ($C_{30}$), 10 g. of cis-β-carotene, 10 g. of ascorbylpalmitate, and 1 g. of α-tocopherol are dissolved in 375 g. of chloroform with warming.

*Solution II.*—80 g. of gelatin and 10 g. of saccharose oleate are dissolved with heating each in 120 g. of water and both solutions combined.

*Solution III.*—1 g. of sodium hydroxide is dissolved in 20 g. of water.

Solution II is added to a 4-necked round-bottom flask heated to 60° C. and evacuated to 180 mm. of mercury pressure. Then with stirring, Solution I is added slowly and a corresponding quantity of Solution III introduced simultaneously, the solutions being added through two dropping funnels. The vacuum is regulated in such a way so that the chloroform from the foaming mass is almost completely distilled off. The residue is dried in a vacuum drying oven at 45° C.

40 mg. of the colored preparation obtained above is dispersed in 2 ml. of water with warming at 35° C. The solution is heated to 60° C. on a water bath and diluted with 8 ml. of water. This colored solution is added to 150 g. of simple syrup and 10 g. of orange concentrate (1:6) and mixed thoroughly. After the addition of 2 g. of citric acid dissolved in 2 ml. of water, carbonic acid-saturated water is added to form one liter. The resulting product is an orange drink having a beautiful yellow-orange color.

Example 9

5 g. of β-apo-8'-carotenal ($C_{30}$), 10 g. of cis-β-carotene, 70 g. of ascorbylpalmitate, 10 g. of sodium carbonate, 1 g. of α-tocopherol, 3 g. of lecithin, and 1 g. of water are dissolved or suspended in 750 g. of chloroform by heating to the boiling point and evaporated in a rotating evaporator at 45° C. bath temperature under the vacuum of a water pump.

Example 10

The powder obtained according to Example 9 and sugar in the same amount (by weight) are finely ground in a ball mill. In place of sugar there can be used, for example, dextrin or glycerin. The resulting product is readily soluble in water.

Example 11

5 g. of β-apo-8'-carotenal ($C_{30}$), 10 g. of cis-β-carotene, 70 g. of ascorbylpalmitate, 10 g. of sodium carbonate, 1 g. of α-tocopherol, 3 g. of lecithin, 1 g. of water, and 100 g. of dextrin are dissolved or suspended in 800 g. of chloroform maintained at the boiling point. The solution is then evaporated to dryness under vacuum.

Example 12

9.9 g. of trans-β-carotene, 6.6 g. of cis-β-carotene, 16.5 g. of ascorbylpalmitate, and 1.1 g. of α-tocopherol are dissolved in 375 g. of chloroform with warming. This solution is emulsified with a solution of 65 g. of gum arabic, 150 g. of water, and 1.65 g. of sodium hydroxide. The chloroform is distilled off with stirring under vacuum and the residue evaporated to dryness in a vacuum drying oven.

Example 13

3 g. of β-carotene, 4.5 g. of lysine-palmitoyl ascorbate, and 0.2 g. of α-tocopherol are taken up in 25 g. of chloroform with warming and the solution homogenized in 92.3 g. of distilled water. The pH is adjusted to 7 with dilute sodium hydroxide. The solvents are distilled off from the emulsion through heating of the emulsion under vacuum.

Example 14

3 g. of β-carotene, 4.5 g. of arginine-palmitoyl ascorbate, and 0.2 g. of α-tocopherol are taken up in 25 g. of chloroform with warming and the solution homogenized in 92.3 g. of distilled water. The pH is adjusted to 7 with sodium carbonate solution. The solvents are distilled from the emulsion by heating under vacuum.

Example 15

*Solution I.*—3 g. of cis-β-carotene, 4.5 g. of lysine-palmitoyl ascorbate, and 0.35 g. of α-tocopherol are taken up in 25 g. of chloroform with warming.

*Solution II.*—5 g. of gelatin are dissolved in 85.4 g. of distilled water under heating and the solution cooled to 38° C. To this solution 0.75 g. of papain is added and allowed to act for 5 minutes. Thereafter the solution is heated to 100° C. and, after cooling, 1 g. of 25% ammonia added thereto.

Solution I is homogenized into Solution II and the solvents distilled off from the emulsion by heating under vacuum.

Example 16

*Solution I.*—18.2 g. of cis-β-carotene, 7 g. of ascorbylpalmitate, 3.6 g. of methanolic sodium hydroxide (1.25%), and 2.2 g. of α-tocopherol are dissolved in 360 g. of a 5.3% solution of sodium tocopherol phosphate in methanol and chloroform (1:1).

*Solution II.*—66 g. of gelatin are dissolved with heating in 250 g. of distilled water and the resulting solution cooled to 38° C. Then 1 g. of papain is added and allowed to ferment for 8 minutes. It is then warmed to 100° C., cooled, and 1.8 g. of a 25% ammonia solution added thereto.

Solution II is mixed with Solution I under stirring by adding it in a thin stream, and the resulting mixture homogenized. After removal of the solvents by distillation by heating the emulsion under vacuum, there is obtained a liquid color preparation.

Through drying of the emulsion in a vacuum drying oven at 40° C. or in an oven with air circulation at 35° C. there is obtained a cold water dispersible dry preparation.

Example 17

*Solution I.*—44.5 g. of rennet-casein is dissolved with stirring in 200 g. of distilled water mixed with 50 ml. of ammonia solution and maintained for 2 hours under stirring at 60° C. Then 0.3 g. of sodium taurocholate is added thereto.

*Solution II.*—2.2 g. of cis-β-carotene, 1.9 g. of trans-β-carotene, 0.4 g. of ammonium ascorbyl-palmitate, 0.4 g. of ascorbyl-palmitate, and 0.4 g. of α-tocopherol are taken up in 30 g. of chloroform and heated to the boiling point of the chloroform.

Solution I and Solution II are homogenized together, the organic solvents removed from the emulsion by treatment with vacuum under heating, and the excess ammonia liberated by drying in a vacuum drying oven at 40° C. or an oven with air circulation at 35° C.

Variations in the process of the invention can be undertaken by those skilled in the art without departing from either the scope or spirit of the invention.

I claim:

1. Water dispersible carotenoid preparations comprising a carotenoid coloring agent and a salt of a higher fatty acid ester of ascorbic acid; said higher fatty acid having from 12 to 20 carbon atoms, and said salt being selected from the group consisting of alkali metal and amino acid salts.

2. A preparation according to claim 1 wherein the higher fatty acid ester of ascorbic acid is an alkali metal salt of palmitoyl ascorbate.

3. A carotenoid preparation according to claim 1 wherein said preparation also contains a protective colloid.

4. A carotenoid preparation according to claim 1 wherein said preparation contains an antioxidant.

5. A carotenoid preparation according to claim 1 wherein said carotenoid coloring agent is selected from the group consisting of $\beta$-carotene, $\beta$-apo-8'-carotenal, $\beta$-apo-12'-carotenal, canthaxanthin, and mixtures thereof.

6. A carotenoid preparation according to claim 1 wherein said carotenoid coloring agent is an ester of $\beta$-apo-8'-carotenoic acid.

7. A carotenoid preparation according to claim 1 wherein the carotenoid coloring agent is present to at least 5% of the preparation.

8. A preparation according to claim 2 wherein the alkali metal salt is a sodium salt.

9. A carotenoid preparation according to claim 3 wherein the protective colloid is selected from the group consisting of gelatin, partially degraded gelatin, dextrin, gum arabic, a saccharose ester of a higher fatty acid, and mixtures thereof.

10. A carotenoid preparation according to claim 4 wherein said antioxidant is selected from the group consisting of tocopherol, ascorbic acid, and mixtures thereof.

11. A process for the preparation of water dispersible carotenoid preparations comprising the steps of forming a solution of a carotenoid coloring agent in an organic carotenoid solvent together with a salt of a higher fatty acid ester of ascorbic acid, and removing said solvent from the resulting mixture; said higher fatty acid having from 12 to 20 carbon atoms, and said salt being selected from the group consisting of alkali metal and amino acid salts.

12. A process according to claim 11 wherein said organic solvent is removed by heating the mixture in the presence of water.

13. A process according to claim 11 wherein said solution is formed in the presence of an amino acid.

14. A process according to claim 11 wherein said salt is an alkali metal salt of ascorbyl-palmitate.

15. A process according to claim 11 wherein said organic carotenoid solvent is a polyhalogenated methane.

16. A process according to claim 11 wherein said carotenoid coloring agent is selected from the group consisting of $\beta$-carotene, $\beta$-apo-8'-carotenal, $\beta$-apo-12'-carotenal, canthaxanthin, and mixtures thereof.

17. A process according to claim 11 wherein said carotenoid coloring agent is an ester of $\beta$-apo-8'-carotenoic acid.

18. A process according to claim 11 wherein said solution is mixed with an aqueous solution of a colloid to produce an emulsion.

19. A process according to claim 18 wherein said colloid is selected from the group consisting of gelatin, partially degraded gelatin, dextrin, gum arabic, a saccharose ester of a higher fatty acid and mixtures thereof.

20. A process according to claim 18 wherein the emulsion is homogenized.

21. A water dispersible carotenoid preparation comprising a carotenoid coloring agent and an amino acid salt of palmitoyl ascorbate.

References Cited by the Examiner

UNITED STATES PATENTS 2,628,930  2/53  Zentner _____ 99—11 X
2,861,891  11/58  Bauernfeind et al. _____ 99—148

OTHER REFERENCES

Swern et al.: Oil and Soap, vol. 20, November 1943, pages 224–6, Gillete Publishing Co., Chicago.

A. LOUIS MONACELL, *Primary Examiner.*